Aug. 25, 1925. 1,550,944
D. C. BEIDLER ET AL
STAND FOR CAMERAS AND THE LIKE
Filed June 9, 1924  3 Sheets-Sheet 2
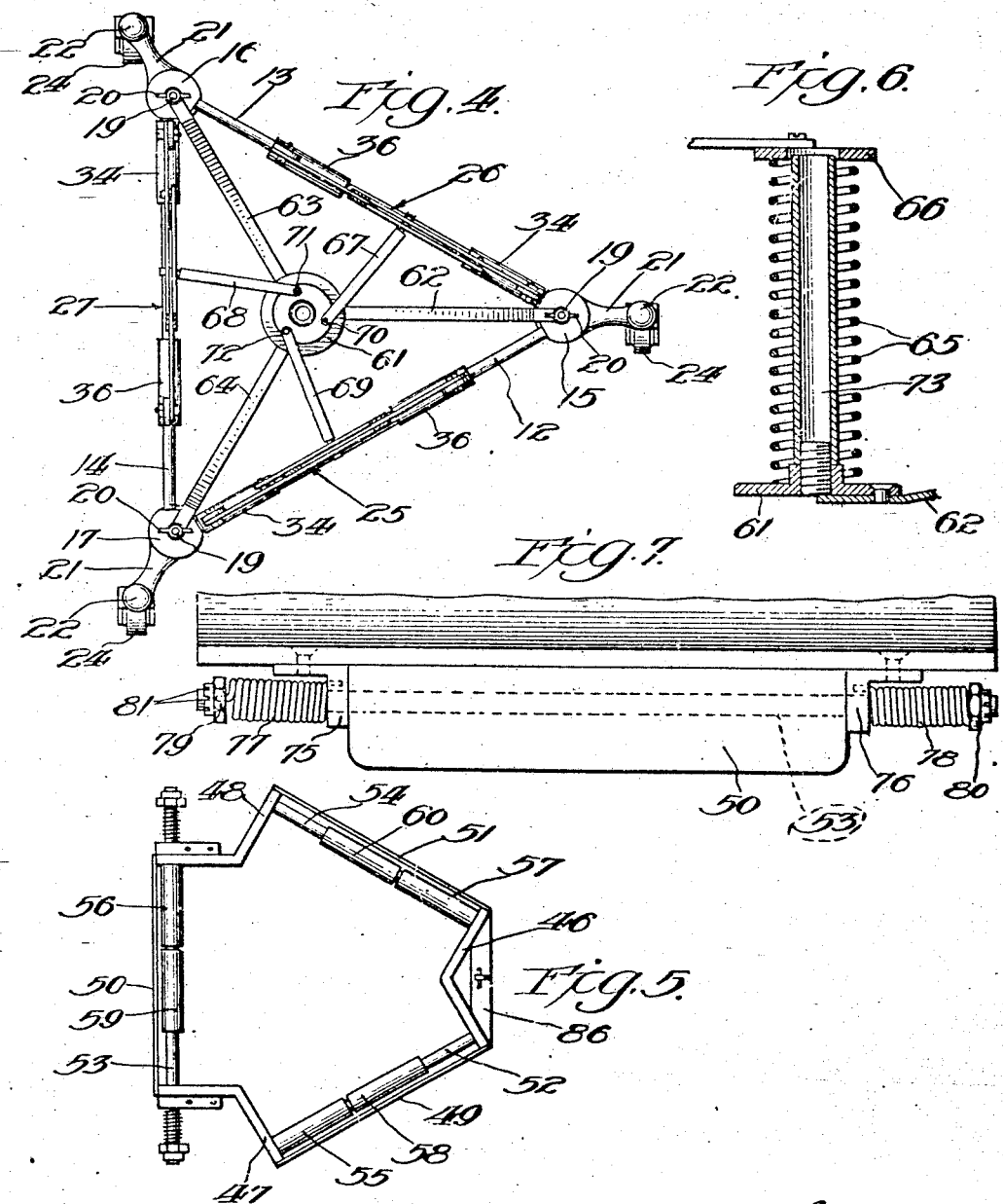
Inventors
Donald C. Beidler,
Antonius J. Viken.

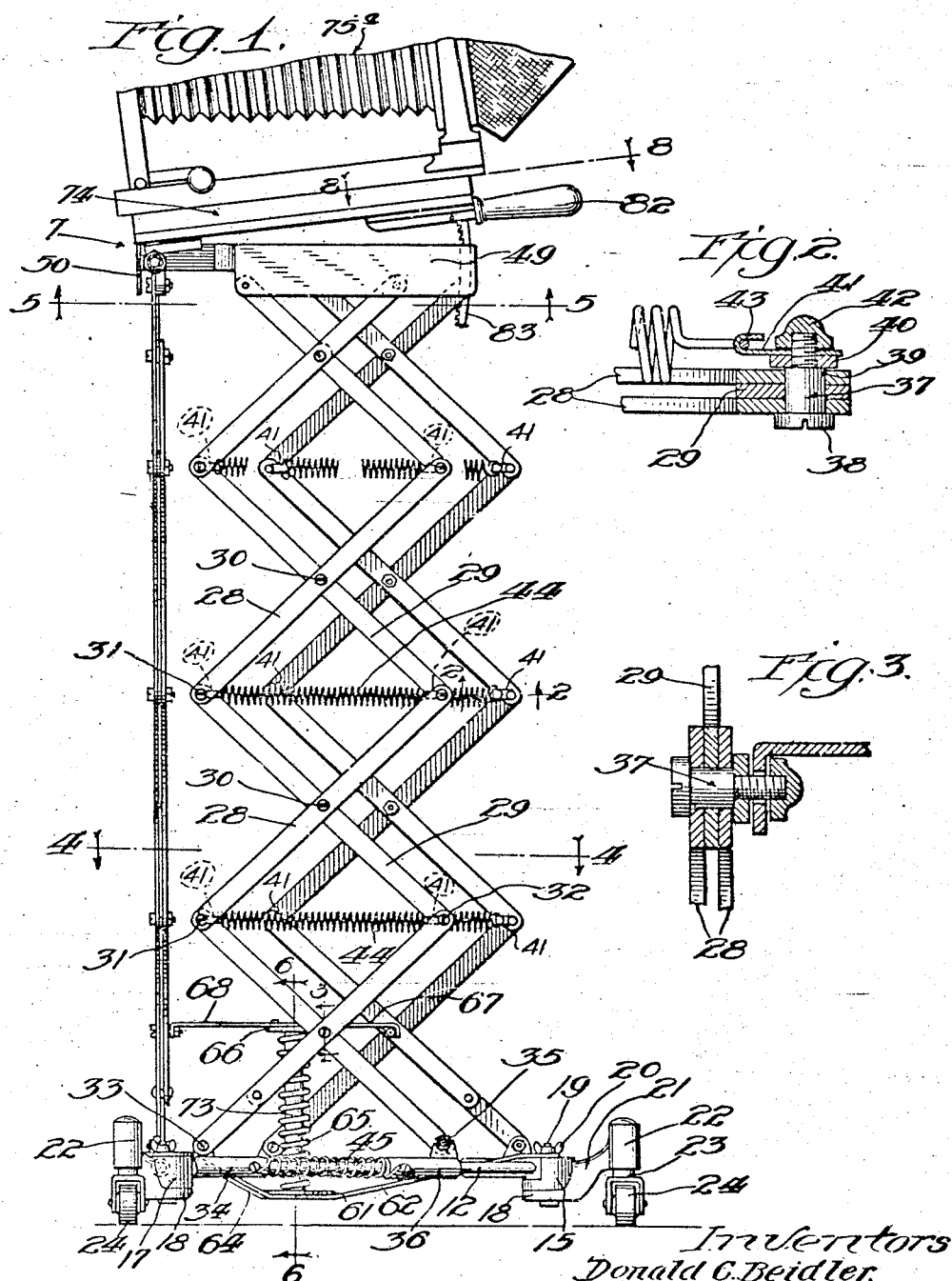

Aug. 25, 1925.
D. C. BEIDLER ET AL
1,550,944
STAND FOR CAMERAS AND THE LIKE
Filed June 9, 1924    3 Sheets-Sheet 3
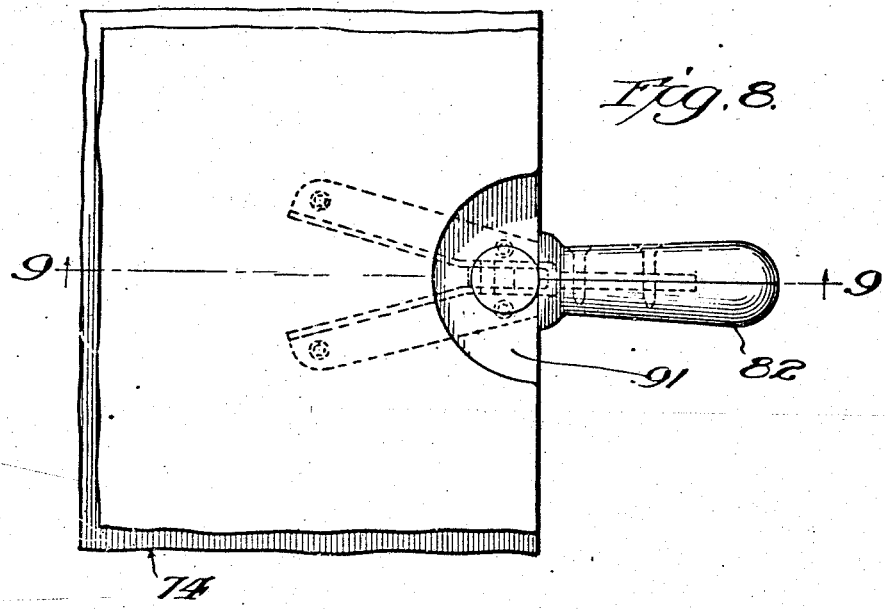
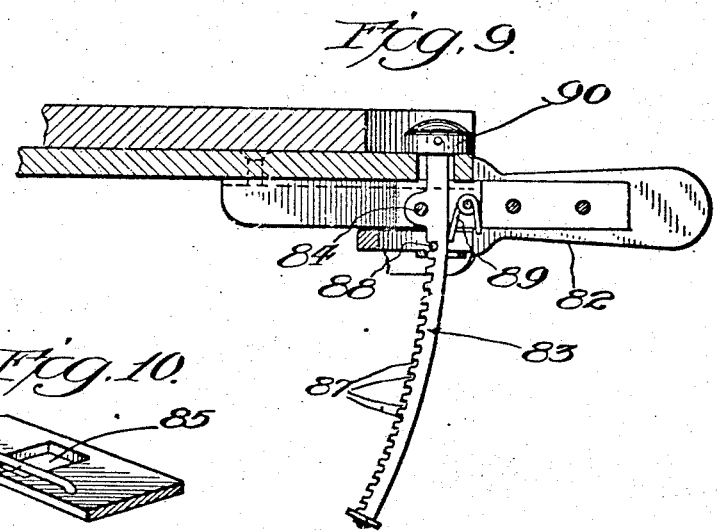
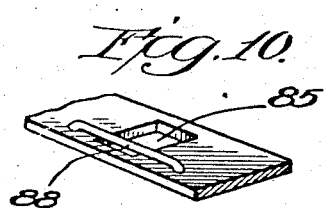
Inventors:
Donald C. Beidler,
Antonius Tiken.

Patented Aug. 25, 1925.

1,550,944

UNITED STATES PATENT OFFICE.

DONALD C. BEIDLER AND ANTONIUS J. VIKEN, OF CHICAGO, ILLINOIS.

STAND FOR CAMERAS AND THE LIKE.

Application filed June 9, 1924. Serial No. 718,821.

*To all whom it may concern:*

Be it known that we, DONALD C. BEIDLER and ANTONIUS J. VIKEN, both citizens of the United States, both residing at Chicago, in the county of Cook and State of Illinois, have invented certain new and useful Improvements in Stands for Cameras and the like, of which the following if a specification.

This invention has to do with certain improvements in stands for cameras and the like. The invention has reference particularly to improvements in adjustable stands, the elevation and position of which can be readily adjusted so as to bring the camera, which is mounted on the stand, into the desired position and focus.

At this point we will state that while the stand herein disclosed has been arranged with a particular view to the requirements of photographic work, it will appear that stands embodying the features of the present invention may also be used to advantage in certain other classes of work. We will, however, make particular reference to the use of this stand for photographic work, since this work presents certain peculiar conditions of operation and adjustment for which the stand is peculiarly adapted.

One of the objects of the invention is to provide a vertically adjustable stand, but to so arrange the same that the weight of the camera and other supported parts will be practically balanced at all times. This will make it possible to move the camera up and down for purposes of adjustment with a minimum amount of effort on the part of the operator. It will also make it possible for the camera to remain in any given elevation without the need of especially securing the same at such point.

A further feature of the invention has reference to the provision of a platform which directly carries the camera, said platform being located at the upper end of the stand, and being angularly adjustable about a horizontal axis, so that the pitch of the focal axis of the camera can be adjusted. In this connection, it is a further object to provide a very simple and convenient arrangement of hand grip for directly manipulating this platform. In this way, the force to adjust the elevation and angle of the camera is applied directly to the platform on which the camera itself is mounted.

In connection with the foregoing, it is a further object to provide a counter balancing spring intermediate between the aforesaid platform and the upper portion of the stand itself, which spring is also operable to practically balance the weight of the camera and platform. As a consequence, the upward force exerted by the stand itself is communicated to the platform through this balancing spring, and, therefore, the tendency which would otherwise exist for the platform to be thrown violently against the upper end of the stand is also eliminated and the parts are kept in perfect balance at all time.

Another feature of the invention relates to the provision of means for taking care of the weight of the stand and camera when the camera is lowered to the lowermost position, notwithstanding the fact that at such times the angularity of the leverage exerted within the stand itself is largely lost, so that the springs which are ordinarily used lose largely their effectiveness.

Other features of the invention relate to the provision of an improved construction of base which is well adapted for easy movement over floors covered with carpets and rugs, to the provision of a construction which is rugged and at the same time light and of pleasing appearance, and generally to the provision of a construction which is very well adapted for the work for which it is intended.

Other objects and uses of the invention will appear from a detailed description of the same, which consists in the features of construction and combinations of parts hereinafter described and claimed.

In the drawings:

Figure 1 shows a side elevation of a stand embodying the features of the present invention, the same being in the partially raised position, and this figure also shows the lower portion of a camera in place on the platform;

Fig. 2 shows a fragmentary horizontal section on the line 2—2 of Fig. 1, looking upwards as shown by the arrows on enlarged scale;

Fig. 3 shows a fragmentary section on the line 3—3 of Fig. 1, looking in the direction of the arrows and on enlarged scale;

Fig. 4 shows a plan view of the device taken substantially on the line 4—4 of Fig. 1, looking in the direction of the arrows;

Fig. 5 shows a section substantially on the line 5—5 of Fig. 1, looking in the direction of the arrows;

Fig. 6 shows a vertical section through the central spring supported limit member, being taken substantially on the line 6—6 of Fig. 1, looking in the direction of the arrows, but on enlarged scale;

Fig. 7 shows a fragmentary face view looking in the direction of the arrow marked with the numeral 7 in Fig. 1, but on enlarged scale;

Fig. 8 shows a fragmentary plan view of the platform taken on the line 8—8 of Fig. 1, looking in the direction of the arrows, but on enlarged scale;

Fig. 9 is a fragmentary section on the line 9—9 of Fig. 8, looking in the direction of the arrows; and Fig. 10 is a fragmentary perspective view of the opening through which the curved rack bar of Fig. 9 operates.

In the construction shown in the drawings we provide a base member of triangular form including the rods or pipe 12, 13 and 14 which are secured to the corner blocks 15, 16 and 17 respectively. Each of these corner blocks is of cylindrical form. Casters are provided for them, each caster including a bottom plate 18 which is pivotally connected to the corner block by a pin 19 reaching up through the corner block and provided with a wing nut 20 at its upper end. By tightening the wing nut the position of the caster arm 21 is fixed with respect to the corner block. The caster arms can be turned around close to the corner blocks in order to bring them into a more compact space for packing the outfit. At its outer end the caster arm carries a socket 22 within which the caster stem 23 is pivoted, so that the caster wheel 24 can easily turn into any position dictated by the movement of the device.

Reaching upwards from the three side members 12, 13 and 14 are three corresponding sets of lazy tongs or the like 25, 26, and 27. These are of similar construction and the description of one of them will suffice for them all.

Each lazy tongs includes the usual pairs of cross arms 28 and 29 pivoted together in their central portions, as shown at 30 in Fig. 1. The adjacent ends of the adjoining pairs of lazy tongs are also pivoted together, as shown at 31 and 32 in Fig. 1.

The lower end of the lowermost arm 28 is pivoted at the point 33 to a lug on a fixed sleeve 34 of the side arm of the base member, and the lower end of the companion bar 29 is pivoted at the point 35 to an upstanding lug on a sleeve 36 which is slidably mounted on the same side bar of the base member.

Usually the companion arms of the lazy tongs will be single and double respectively. Thus in the construction of Fig. 1, each of the arms 29 is single and each of the arms 28 is double, embracing the companion arm 29 at its central portion and embracing the adjoining ends of the arms 29 of the next higher and lower series. By this single and double type of construction a balanced arrangement is insured and tendency of the parts to twist sidewise is substantially eliminated.

Figure 2 is an enlarged detail through the pivotal connection between the ends of arms of adjoining series. As therein illustrated the pivotal connection is established by a machine screw 37 which is provided with a head 38 and is shouldered at the point 39, being threaded beyond said shoulder so as to receive the nut 40. Upon tightening up the nut the same engages the shoulder so as to prevent binding of the arms together.

A clip 41 is set on each of the pins 37, preferably at the outside of the nut 40, being held in place in such case by a cap nut 42. These clips 41 are provided with hooks 43 which receive the ends of the cross tension springs 44 which are shown particularly in Fig. 1. There is a set of these springs 44 for each lazy tongs, there being three sets of springs in the construction herein disclosed. These springs 44 tend to draw the arms of the lazy tongs to which they are connected into parallelism and thus extend the lazy tongs vertically so as to raise the flatform. Another tension spring 45 is placed around each of the side bars of the base member between the sleeves 34 and 36 thereon, to which sleeves it is connected, and thus also assists to extend the lazy tongs.

At the upper end of the lazy tongs structure there is located a frame, shown in detail in Fig. 5. The same includes corner members 46, 47 and 48 corresponding to the corner members 15, 16 and 17 of the base member. Side plates 49, 50 and 51 join the corner members together, and rods 52, 53 and 54 also reach between said corner members and parallel to the side plates.

Secured upon these rods are sleeves 55, 56 and 57, and other sleeves 58, 59 and 60 are slidably mounted thereon.

The upper ends of the companion bars of the various lazy tongs are pivotally connected to the proper sleeves just referred to, so that the upper ends of the lazy tongs can shift back and forth as need be.

It will be noted that as the stand is depressed so that the springs are extended their tension increases, but the angularity of the lazy tongs bars becomes rapidly smaller, so that the effectiveness of the tension of the springs begins to decrease rapidly after the device is lowered beyond a certain point. We have, therefore, provided a compensating device which we will now describe having reference particularly to Figs. 1, 3, 4 and 6. The same includes a platform 61 supported centrally within the base member by means of radius arms 62, 63 and 64 which reach outwardly therefrom to the respective corner blocks 15, 16 and 17.

Reaching upwardly from the platform 61 is a spiral spring 65 the upper end of which presses against a plate 66. Said plate 66 in turn is connected to the three lazy tongs members by the radius arms 67, 68, and 69 respectively. In this connection, it is to be noted that as the lazy tongs are depressed they are subject to a lateral movement due to the fact that one of each of the lower corners is anchored by the sleeve 34. The radius arms 67, 68 and 69 are therefore compelled to move sidewise as they are forced down by the collapsing of the lazy tongs, but such sidewise movement is permitted by pivotally connecting the inner ends of the radius arms to the plate 66, as shown at 70, 71 and 72 of Fig. 4. The outer ends of the lazy tongs are connected to the respective pins 37 in the manner shown more in detail in Fig. 3.

With this arrangement, as the device is forced downwards the pressure exerted by the spring 65 increases and exerts a direct support for the stand; and by proper arrangement and proportioning of parts, this direct support will practically compensate for the loss of angularity between the companion bars of the lazy tongs.

If desired, a central post 73 may be provided on the platform 61, the same reaching up through a suitable opening in the top plate 66 and serving to guide the spring so as to prevent it from collapsing sidewise under pressure.

A platform 74 is carried by the upper end of the stand, on which platform may be supported the camera 75ᵃ or other device. The platform has at its front edge a pair of brackets 75 and 76 which reach down to the position of the rod 53 at points outside of the location of the corner blocks 47 and 48. These brackets 75 and 76 are rigidly connected to the platform and are pivotally mounted on the rod 53, said rod in turn being rigidly held against rotation.

Springs 77 and 78 encircle the end portions of the rod. The inner ends of these springs are secured to the brackets 75 and 76 respectively, and their outer ends are secured to the rod by means of suitable blocks 79 and 80. These in turn can be angularly adjusted on the rod 53 as by means of pins set through said rod and through recesses 81 in the nuts 79 and 80, in this way the tension of the two springs can be adjusted, so that the weight of the platform 74 is substantially balanced at all times, or is almost balanced, leaving only a very small amount of weight to be supported otherwise.

At the back side of the platform 74 there is located a pistol handle 82 of convenient form and size to be grasped in the hand of the user. This handle may be used to turn the entire stand around into different positions, and may also be used to raise and lower the stand together with the platform and camera. When doing so, it will be understood that the balancing action of all of the springs relieves the operator of any substantial load and greatly facilitates the action.

A curved rack bar 83 is pivoted to the handle 82 at the point 84 and reaches down through a slotted opening 85, which is in a cross plate 86 adjacent to the corner block 46 of the upper end of the stand. The forward edge of this rack bar is notched, as shown at 87, and the notches thereof are adapted to engage the rod 88, which reaches across the front edge of the slotted opening 85. A spring 89 tends to throw the rack bar into the locking position, shown in Fig 9, wherein its teeth will engage the wire 88 but a thumb piece 90 is placed on the upper end of the rack bar within a recess 91 o the platform and at a point where it can b readily manipulated by the thumb of th hand grasping the handle 82.

With this arrangement it will be under stood that in order to change the angle of th platform it is only necessary to press th button 90 forwards by the use of the thum so as to release the rack bar, whereupon th angle of the platform can be changed to tha desired and then the parts again locked t together.

While we have herein shown and de scribed only a single embodiment of th features of our present invention, still we d not intend to limit ourselves to the sam except as we may do so in the claims.

We claim:

1. A device of the class described con prising in combination a triangular bas member including corner blocks, caster pivotally connected thereto, and side ro constituting a triangle, a top frame includ ing corner blocks, side rods connected ther to, and constituting therewith a triangul frame, and lazy tongs extending betwee each of the side rods of the base frame an the corresponding side rod of the top fram a sliding connection between each lazy ton and the frame rods to which it is connecte each lazy tongs including a single and double pair of bars pivotally connected their mid portions, pivotal connections b tween the ends of each double lazy tongs b and the adjacent single lazy tongs bar horizontal tension springs within each la tongs tending to draw the bars thereof in parallelism and thereby extend the la tongs vertically, a center platform in the base member, supports from the corner blocks thereto, a plate between the lazy tongs and above said platform, connections from the lazy tongs thereto tending to depress said plate as the lazy tongs are forced down, a vertically extending spring between the platform and the top plate aforesaid for directly supporting the load of the lazy tongs, a camera platform above the top frame, a hinge connection between one edge of the same and one side of the said frame permitting said platform to be tilted about a horizontal axis, springs between the camera platform and the top frame aforesaid and normally substantially balancing the weight of the platform, a pistol handle extending outwardly from the side of the camera platform aforesaid to the hinged side aforesaid, and a latch between the platform and frame and convenient of manipulation by the hand grasping the pistol handle, substantially as described.

2. A device of the class described comprising in combination a triangular base member including corner blocks, casters pivotally connected thereto, and side rods constituting a triangle, a top frame including corner blocks, side rods connected thereto, and constituting therewith a triangular frame, and lazy tongs extending between each of the side rods of the base frame and the corresponding side rod of the top frame, a sliding connection between each lazy tongs and the frame rods to which it is connected, horizontal tension springs within each lazy tongs tending to draw the bars thereof into parallelism and thereby extend the lazy tongs vertically, a center platform in the base member, supports from the corner blocks thereto, a plate between the lazy tongs and above said platform, connections from the lazy tongs thereto tending to depress said plate as the lazy tongs are forced down, a vertically extending spring between the platform and the top plate aforesaid for directly supporting the load of the lazy tongs, a camera platform above the top frame, a hinge connection between one edge of the same and one side of the said frame permitting said platform to be tilted about a horizontal axis, springs between the camera platform and the top frame aforesaid and normally substantially balancing the weight of the platform, a pistol handle extending outwardly from the side of the camera platform aforesaid to the hinge side aforesaid, and a latch between the platform and frame and convenient of manipulation by the hand grasping the pistol handle, substantially as described.

3. A device of the class described comprising in combination a triangular base member including corner blocks, casters pivotally connected thereto, and side rods constituting a triangle, a top frame including corner blocks, side rods connected thereto and constituting therewith a triangular frame, and lazy tongs extending between each of the side rods of the base frame and the corresponding side rod of the top frame, a sliding connection between each lazy tongs and the frame rods to which it is connected, horizontal tension springs within each lazy tongs tending to draw the bars thereof into parallelism and thereby extending the lazy tongs vertically, a camera platform above the top frame, a hinge connection between one edge of the same and one side of the said frame permitting said platform to be tilted about a horizontal axis, springs between the camera platform and the top frame aforesaid and normally substantially balancing the weight of the platform, a pistol handle extending outwardly from the side of the camera platform aforesaid to the hinged side aforesaid, and a latch between the platform and frame and convenient of manipulation by the hand grasping the pistol handle, substantially as described.

4. A device of the class described comprising in combination a triangular base member including corner blocks, casters pivotally connected thereto, and side rods constituting a triangle, a top frame including corner blocks, side rods connected thereto, and constituting therewith a triangular frame, and lazy tongs extending between each of the side rods of the base frame and the corresponding side rod of the top frame, a sliding connection between each lazy tongs and the frame rods to which it is connected, horizontal tension springs within each lazy tongs tending to draw the bars thereof into parallelism and thereby extending the lazy tongs vertically, a camera platform above the top frame, a hinge connection between the edge of the same and one side of the said frame permitting said platform to be tilted about a horizontal axis, and springs between the camera platform and the top frame aforesaid and normally substantially balancing the weight of the platform, substantially as described.

5. A device of the class described comprising in combination a triangular base member including corner blocks, and side rods constituting a triangle, a top frame including corner blocks, side rods connected thereto, and constituting therewith a triangular frame, and lazy tongs extending between each of the side rods of the base frame and the corresponding side rod of the top frame, a sliding connection between each lazy tongs and the frame rods to which it is connected, horizontal tension springs within each lazy tongs tending to draw the bars thereof into parallelism and thereby extending the lazy tongs vertically, a center platform in the base member, supports from the corner blocks thereto, a plate between the lazy tongs and above said platform, connections from the lazy tongs thereto tending to depress said plate as the lazy tongs are forced down, a vertically extending spring between the platform and the top plate aforesaid for directly supporting the load of the lazy tongs, a camera platform above the top frame, a hinge connection between one edge of the same and one side of the said frame permitting said platform to be tilted about a horizontal axis, springs between the camera platform and the top frame aforesaid and normally substantially balancing the weight of the platform, a pistol handle extending outwardly from the side of the camera platform aforesaid to the hinged side aforesaid, and a latch between the platform and frame and convenient of manipulation by the hand grasping the pistol handle, substantially as described.

6. A device of the class described, comprising in combination a triangular base member including corner blocks, and side rods constituting a triangle, a top frame including corner blocks, side rods connected thereto, and constituting therewith a triangular frame, and lazy tongs extending between each of the side rods of the base frame and the corresponding side rod of the top frame, a sliding connection between each lazy tongs and the frame rods to which it is connected, horizontal tension springs within each lazy tongs tending to draw the bars thereof into parallelism and thereby extend the lazy tongs vertically, a center platform in the base member, supports from the corner blocks thereto, a plate between the lazy tongs and above said platform, connections from the lazy tongs thereto tending to depress said plate as the lazy tongs are forced down, a vertically extending spring between the platform and the top plate aforesaid for directly supporting the load of the lazy tongs, a camera platform above the top frame, a pistol handle extending outwardly from the side of the camera platform opposite to the hinged side aforesaid, and a latch between the platform and frame and convenient of manipulation by the hand grasping the pistol handle, substantially as described.

7. A device of the class described comprising in combination a triangular base member including corner blocks, and side rods constituting a triangle, a top frame including corner blocks, side rods connected thereto, and constituting therewith a triangular frame, and lazy tongs extending between each of the side rods of the base frame and the corresponding side rod of the top frame, a sliding connection between each lazy tongs and the frame rods to which it is connected, horizontal tension springs within each lazy tongs tending to draw the bars thereto into parallelism and thereby extend the lazy tongs vertically, a center platform in the base member, supports from the corner blocks thereto, a plate between the lazy tongs and above said platform, connections from the lazy tongs thereto tending to depress said plate as the lazy tongs are forced down, a vertically extending spring between the platform and the top plate aforesaid for directly supporting the load of the lazy tongs, a camera platform above the top frame a hinge connection between one edge of the same and one side of the said frame permitting said platform to be tilted about a horizontal axis, and springs between the camera platform and the top weight of the platform, substantially as described.

8. A device of the class described comprising in combination a base frame having side rods, a top frame having side rods parallel to the side rods of the base frame, a lazy tongs extending between each of the base frame side rods and the corresponding top frame side rod, a sliding connection between the lazy tongs and the side rods to which it is connected, horizontal tension springs within each lazy tongs tending to draw the bars thereof into parallelism and thereby extend the lazy tongs vertically, a center platform in the base member, a plate above the same, connections from the lazy tongs thereto tending to depress said plate as the lazy tongs are forced down, and a vertically extending spring between the platform and the top plate aforesaid for directly supporting the load of the lazy tongs, substantially as described.

9. A device of the class described comprising in combination a base frame, a top frame above the same, and lazy tongs between both of said frames, a sliding connection between the lazy tongs and each frame, springs within the lazy tongs tending to draw the arms thereof into parallelism and thereby extend the lazy tongs vertically, a camera platform above the top frame, a hinge connection between each edge of the same and the top frame permitting said platform to be tilted about a horizontal axis, and a spring connection between the camera platform and the top frame normally substantially balancing the weight of the camera platform, substantially as described.

10. A device of the class described comprising in combination a base frame, a top frame above the same, a spring connection between said frames tending to raise the top frame, a camera platform above the top frame, a hinge connection between the camera platform and the top frame permitting the camera platform to be tilted about a horizontal axis, and a spring connection between the camera platform and the top frame normally substantially balancing the weight of the platform, substantially as described.

11. A device of the class described comprising in combination a base frame, a top frame above the same, a spring connection between said frames tending to raise the top frame, a camera platform above the top frame and movably connected thereto, a spring connection between the top frame and the camera platform normally substantially balancing the weight of the camera platform, and a suitable hand grip on the camera platform, substantially as described.

12. A device of the class described comprising in combination a base frame, a top frame above the same, a spring connection between said frames tending to raise the top frame, a camera platform above the top frame and movably connected thereto, and a spring connection between the top frame and the camera platform normally substantially balancing the weight of the camera platform, substantially as described.

13. A device of the class described comprising in combination a base member, a vertically movable top frame above the same, lazy tongs extending between the base member and the top frame, springs within the lazy tongs tending to draw the bars thereof into parallelism and thereby extend the lazy tongs vertically to raise the top frame, a camera platform above the top frame, a pivotal connection between one side of the camera platform and the top frame, a spring between the top frame and camera platform tending to raise the camera platform with respect to the top frame, and support the load thereof, a pistol handle extending outwardly from that side of the camera platform opposite to the hinged connection aforesaid, and a latch between the camera platform and the top frame convenient of manipulation by the hand grasping the pistol handle, substantially as described.

14. A device of the class described comprising in combination a base member, a top frame above the same, a camera platform pivotally connected to the top frame to permit the camera platform to rock about one edge with respect to the top platform, spring means between the base member and the top frame serving to normally support the load of the top frame, spring means between the top frame and the camera platform serving to normally support the load of the camera platform, and a latch between the camera platform and the top frame serving to normally lock these parts in fixed position with respect to each other whereby they may be raised and lowered as a unit, substantially as described.

15. A device of the class described comprising in combination a base member, a top frame, a lazy tongs extending between the base member and the top frame, springs within the lazy tongs tending to draw the bars thereof into parallelism and thereby extend the lazy tongs vertically, a center platform in the base member, a plate above the same, connections from the lazy tongs thereto tending to depress said plate as the lazy tongs are forced down, and a vertically extending spring between the platform and the plate aforesaid for directly supporting the load of the lazy tongs, substantially as described.

DONALD C. BEIDLER.
ANTONIUS J. VIKEN.